(12) United States Patent
Sample et al.

(10) Patent No.: US 12,516,694 B2
(45) Date of Patent: Jan. 6, 2026

(54) CONNECTION ASSEMBLY FOR A MOTOR VEHICLE LOCK

(71) Applicant: Kiekert Aktiengesellschaft, Heiligenhaus (DE)

(72) Inventors: Samantha Sample, Canton, MI (US); Andrew Ziehm, Center Line, MI (US); Michael Uhrin, Oak Park, MI (US); David Keehn, Brighton, MI (US)

(73) Assignee: Kiekert AG, Heiligenhaus (DE)

( * ) Notice: Subject to any disclaimer, the term of this patent is extended or adjusted under 35 U.S.C. 154(b) by 127 days.

(21) Appl. No.: 18/505,440

(22) Filed: Nov. 9, 2023

(65) Prior Publication Data

US 2025/0154977 A1    May 15, 2025

(51) Int. Cl.
F16C 1/10     (2006.01)
E05B 79/20    (2014.01)

(52) U.S. Cl.
CPC .............. F16C 1/107 (2013.01); E05B 79/20 (2013.01); F16C 1/102 (2013.01)

(58) Field of Classification Search
CPC .. F16C 1/10; F16C 1/102; F16C 1/103; F16C 1/107; F16C 1/108; E05B 79/20
See application file for complete search history.

(56) References Cited

U.S. PATENT DOCUMENTS

| | | | | |
|---|---|---|---|---|
| 2,373,776 A * | 4/1945 | Parr | ........................ | F16C 1/107 74/502.6 |
| 3,221,572 A * | 12/1965 | Swick | ..................... | F16C 1/108 285/205 |
| 3,354,742 A * | 11/1967 | Tschanz | ................... | B62D 1/24 138/109 |
| 3,528,313 A * | 9/1970 | Berno | ..................... | F16C 1/262 74/502.4 |
| 4,093,241 A * | 6/1978 | Muntjanoff | .............. | F16J 15/32 74/502 |
| 4,304,148 A * | 12/1981 | Hamman | .............. | F16L 37/008 403/197 |
| 4,534,239 A * | 8/1985 | Heimann | ................ | F16C 1/107 277/572 |

(Continued)

FOREIGN PATENT DOCUMENTS

| | | | | |
|---|---|---|---|---|
| DE | 2852451 | A1 * | 6/1980 | |
| DE | 19702777 | A1 * | 7/1998 | ............. F16C 1/107 |

(Continued)

*Primary Examiner* — Adam D Rogers
(74) *Attorney, Agent, or Firm* — Renner, Otto, Boisselle & Sklar, LLP

(57) ABSTRACT

The object of the invention is a connection assembly for a motor vehicle lock and, in particular, a Bowden cable connection assembly for a motor vehicle door lock. In its basic construction, this is equipped with a main body inserted into a lock housing and with a sealing body made from an elastic plastic for sealing the main body against the lock housing, and/or an actuating element for at least one lock component. According to the invention, the main body is produced from rigid plastic, and the sealing body is formed in two parts. In addition, the sealing body is connected to the main body. Furthermore, the sealing body is formed in two parts with a housing sealing body for sealing against the lock housing and an actuating sealing body functionally and locally separated therefrom for sealing against the actuating element.

18 Claims, 4 Drawing Sheets

(56) References Cited

U.S. PATENT DOCUMENTS

| | | | | |
|---|---|---|---|---|
| 4,621,937 A | * | 11/1986 | Maccuaig | E06C 7/086 |
| | | | | 403/197 |
| 5,570,611 A | * | 11/1996 | Pospisil | F16C 1/12 |
| | | | | 74/502.6 |
| 5,579,663 A | * | 12/1996 | Likich | F16C 1/262 |
| | | | | 74/502.5 |
| 5,806,139 A | | 9/1998 | Anderson et al. | |
| 6,540,427 B2 | * | 4/2003 | Scheidling | F16C 1/108 |
| | | | | 403/187 |
| 10,584,519 B2 | * | 3/2020 | Häger | F16C 1/145 |
| 12,320,169 B2 | * | 6/2025 | Farnesi | E05B 81/34 |
| 2004/0004358 A1 | | 1/2004 | Arlt et al. | |

FOREIGN PATENT DOCUMENTS

| | | | | |
|---|---|---|---|---|
| DE | 29824113 U1 | * | 5/2000 | F16C 1/108 |
| DE | 102018119552 A1 | | 2/2020 | |
| EP | 3308860 B1 | | 1/2018 | |
| FR | 1386035 A | * | 1/1965 | |
| FR | 2678030 A1 | * | 12/1992 | F16C 1/107 |
| FR | 2956707 A1 | * | 8/2011 | F16C 1/102 |
| JP | 57006116 A | * | 1/1982 | |
| JP | 2841446 B2 | * | 12/1998 | |
| JP | 2005233266 A | * | 9/2005 | F16C 1/108 |
| KR | 0131183 Y1 | * | 12/1998 | |

* cited by examiner

A-A   B-B   C-C   D-D

CONNECTION ASSEMBLY FOR A MOTOR VEHICLE LOCK

FIELD OF DISCLOSURE

The invention relates to a Bowden cable connection assembly for a motor vehicle, having a main body inserted into a housing, and having a sealing body made from an elastic plastic for sealing the main body against the housing and relative to an actuating element. The invention is especially meant to be in for a motor vehicle lock. The invention can also be used for other Bowden cable connection assemblies, for example in assemblies, where a Bowden cable passes through the sheet metal of a motor vehicle door or the housing of a motor vehicle door module.

BACKGROUND OF DISCLOSURE

Connection assemblies for a motor vehicle lock generally ensure a sealed connection between the relevant lock housing and the actuating element inserted into the lock housing from the outside. For this purpose, the actuating element can be a flexible actuating element, such as a Bowden cable, for example. In principle, a rod can also be used as an actuating element. A lock component in the interior of the lock housing is acted upon by means of the actuating element. In the simplest case, this can be a pawl as a component of a locking mechanism consisting of a rotary latch and pawl. For this purpose, the actuating element is connected, for example, to a handle.

The handle can be an outer door handle or an inner door handle. In principle, the actuating element can also be acted upon by an electric motor. This is accomplished, for example, by a door-closing drive or a differently designed electromotive drive. In any case, the connection assembly generally ensures that no rainwater, dust, etc., can penetrate into the lock housing via the forced opening for the actuating element.

The generic prior art according to EP 3 308 860 B1 originating from the applicant generally concerns a Bowden cable that is equipped with at least one fastening element. The fastening element acts as a counter bearing for a spring-loaded sleeve and an end stop for a coil spring as components of the Bowden cable. In addition, a sealing body is provided in the form of the sleeve made from an elastomeric plastic. In this way, a kind of stop is already realized together with a seal in the known connection assembly. However, different components are required for this purpose so that the production effort is considerable. This then also leads to considerable costs.

A comparable Bowden cable connection assembly for a motor vehicle lock has been disclosed in DE 10 2018 119 552 A1. This has a wall element through which a Bowden cable core is guided. In the wall element, a Bowden cable connection piece receptacle is provided for coupling to a Bowden cable connection piece and thereby fixing the Bowden cable to the wall element. The Bowden cable connection piece and the Bowden cable connection piece receptacle interact with one another in such a way that the Bowden cable connection piece is inserted in an insertion direction, in particular, orthogonally to the plane, which extends parallel to a force application direction in the event of a crash. As a result, forces arising in the event of a crash should act transversely to the direction of insertion. In this way, it is hoped that an unintentional disconnection of the Bowden cable from the wall element against the direction of insertion is permissibly prevented. This is to allow the Bowden cable to remain functional even in the event of a crash and to enable the door to be opened via the door handle.

The prior art has basically proven itself as far as the known and generic connection assembly is concerned, but in this document, it has a relatively elaborate and complex design. Regarding the second presented document, the flexibility is limited to the extent that the insertion direction of the Bowden cable and a direction of acting force must be aligned with one another.

On the one hand, this is hard to implement reproducibly and for every application in practice, and on the other hand, it limits the universality of the known connection assembly. The invention as a whole seeks to remedy this.

SUMMARY OF DISCLOSURE

The invention is based on the technical problem of further developing such a connection assembly for a motor vehicle in such a way that a universal application is provided at the same time with a simple and cost-effective design.

To solve this technical problem, a Bowden cable connection assembly for a motor vehicle within the scope of the invention is characterized in that the sealing body is formed in two parts and is connected to the main body, wherein a housing sealing body provides the seal against the housing, and an actuating sealing body, functionally and locally separate therefrom, provides the seal against the actuating element.

According to the invention, therefore, the main body and the sealing body initially form a structural unit, at least as far as a component of the two-part sealing body is concerned. In fact, the sealing body consists, on the one hand, of the housing sealing body for sealing against the housing, and on the other hand, the actuating sealing body, functionally and locally separated therefrom, for sealing against the actuating element. In this case, at least one component of this two-part sealing body forms a structural unit together with the main body. Generally, both components of the housing sealing body are connected to the main body.

First off, this allows a particularly simple and functionally appropriate design to be realized, because the main body and the two-part or two-piece sealing body are generally available as a structural component and no further differentiation is made or has to be made between the two components, as is the case with the generic prior art. This allows for particularly economical production and easy assembly. In addition, storage is simplified.

Furthermore, the main body can be produced from rigid plastic and can consequently function as a stop, for example in the event of a crash. If the actuating element is a Bowden cable, the main body made from rigid plastic can consequently function as a crash stop or block element for the Bowden cable in the event of a crash. At the same time, the main body takes over the function of a basic element or structural component to which the two-part or two-piece sealing body is connected. This reduces the complexity.

At the same time, the connection assembly according to the invention can in this way ensure proper sealing of the lock housing and, accordingly, support the separation between the wet area part and the dry area part inside an associated motor vehicle door that accommodates the motor vehicle lock or motor vehicle door lock. In addition, a main body made from rigid plastic ensures that, overall, the guiding and the connection of the Bowden cable are simplified, and any movements of the Bowden cable in the event of a crash and, in particular, of its sheath can be absorbed without damage. As a result, perfect functioning of the Bowden cable and generally the actuating element is also provided after the crash case or during it. The structural stability realized in this way of the connection assembly according to the invention also ensures that, in the event of a crash or after such a crash, the lock component in the interior of the lock housing is and can be acted upon in just the same way as it would be without a crash occurring. This is because the guidance of the actuating element does not change as a result. Herein lie the essential advantages.

As a rule, both components of the housing sealing body are integrally molded on the main body. For this purpose, for example, a two-component injection molding process can be used. In such a two-component injection-molding process, the rigid main body is produced from a first type of plastic, and the sealing body, which is flexible relative thereto, is produced from a second type of plastic that differs therefrom.

The first type of plastic for realizing the rigid main body is generally a thermoplastic (rigid) plastic, such as polyamide (PA), polybutylene terephthalate (PBTP), polycarbonate (PC), styrene-butadiene (SB) and so on, for example, which may be reinforced with embedded fibers, such as glass fibers, carbon fibers, etc., for example. In contrast, a thermoplastic elastomer plastic is generally used as the second type of plastic for the elastic sealing body. In this case, plastics such as acrylonitrile butadiene rubber (NBR), natural rubber (NR), styrene butadiene rubber (SBR), ethylene propylene rubber (EPDM), etc., for example, can be used. Since the aforementioned plastics are always thermoplastic and can consequently be injection molded, the main body can be produced with the sealing body in the common and already mentioned two-component injection molding process. This results in specific cost advantages.

It has also proven useful if the main body has a central bore for the actuating element. In order to realize and implement the necessary rigidness of the main body, it generally has at least one reinforcing rib connected to the bore in question. In this case, the reinforcing rib can be formed circumferentially in relation to the bore. In principle and alternatively, a radial path of the reinforcing rib with respect to the bore is also possible. Of course, combinations are also conceivable.

In addition, according to an advantageous embodiment, the main body has an integrally molded connection piece, with the aid of which the connection assembly according to the invention can be fixed to the lock housing and fastened thereto in a particularly simple and functional manner. For this purpose, the connection piece may be equipped with a bore for a fastening means.

Topologically, it has proven advantageous if the main body is predominantly cylindrical. It is also recommended if the main body is equipped with a head component located outside or in a wall of the housing. In addition to this head component, a foot component is also realized, which is connected to the head component. In this context, the head component has a larger diameter than the foot component, which is provided with a smaller diameter compared to the head component.

In this way, the connection assembly according to the invention is first of all provided with a secure hold in the wall of the lock housing, which is ensured in particular by the head component of the main body. The housing sealing body is advantageously connected to this head component. In contrast, the foot component of the main body predominantly ensures the guidance of the actuating element in the interior of the main body. For this purpose, the foot component is additionally provided with the connected actuating sealing body, which ensures the sealing against the actuating element.

In this way, a Bowden cable connection assembly for a motor vehicle is provided, which functions both as a stop in the event of a crash and as a seal for the actuating element. The Bowden cable can be provided for actuating a lock component in the interior of the lock housing.

This lock component can be a pawl as a component of the locking mechanism consisting of the rotary latch and pawl. In this case, the Bowden cable may be acted upon by an electromotive opening drive or manually. However, it is also possible that the Bowden cable is responsible for acting on the rotary latch. In this case, the Bowden cable represents a component of a closing drive or closing auxiliary drive. Just as well and also comprised by the invention, actuating movements transmitted with the aid of the Bowden cable or generally of the actuating element to individual, other lock components inside the lock housing are conceivable. For this purpose, the electromotive drive may be, for example, a locking drive or central locking drive for a locking lever. This is all merely by way of example. It is also possible, in principle, to utilize the connection assembly as a wire harness pass through to protect electrical cables instead of a Bowden cable assembly. Herein lie the essential advantages.

BRIEF DESCRIPTION OF DRAWINGS

The invention is explained in greater detail below with reference to drawings which show only one exemplary embodiment. In the drawings.

DETAILED DESCRIPTION

Figure 1:
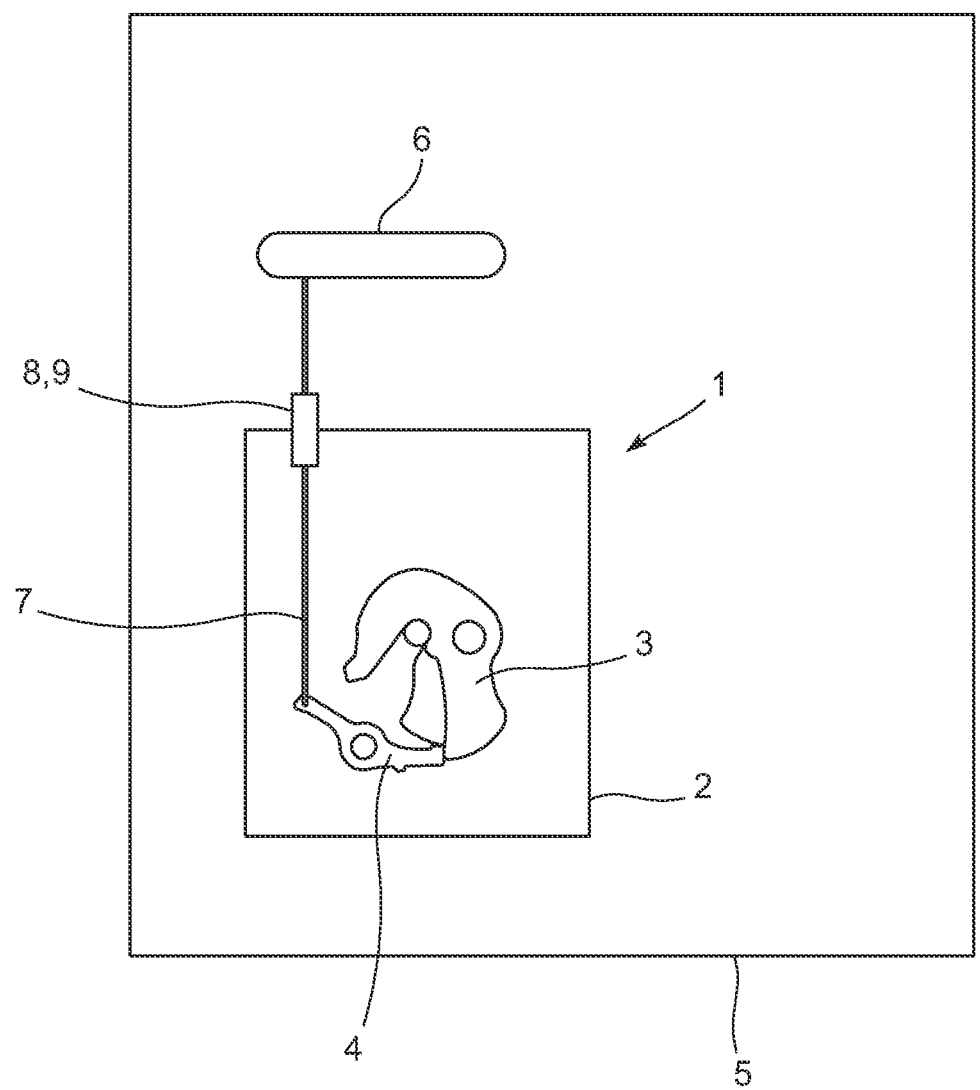
FIG. 1 shows the connection assembly according to the invention in an overview and installation situation in the interior of an indicated motor vehicle door.

In FIG. 1, a motor vehicle lock and in particular a motor vehicle door lock 1 is shown and merely indicated. For this purpose, the motor vehicle lock or motor vehicle door lock 1 has a lock housing 2. In the interior of the lock housing 2, a locking mechanism 3, 4 can be seen consisting essentially of a rotary latch 3 and a pawl 4.

The motor vehicle door lock 1 is itself arranged in the interior of an indicated motor vehicle door 5 and serves to lock it. In addition, the relevant motor vehicle door 5 is also equipped with a door handle 6, which can be an external door handle, or internal door handle, or both. The door handle 6 is connected to the pawl 4 via an actuating element 7. According to the exemplary embodiment, the actuating element 7 is a Bowden cable 7.

Figure 2:
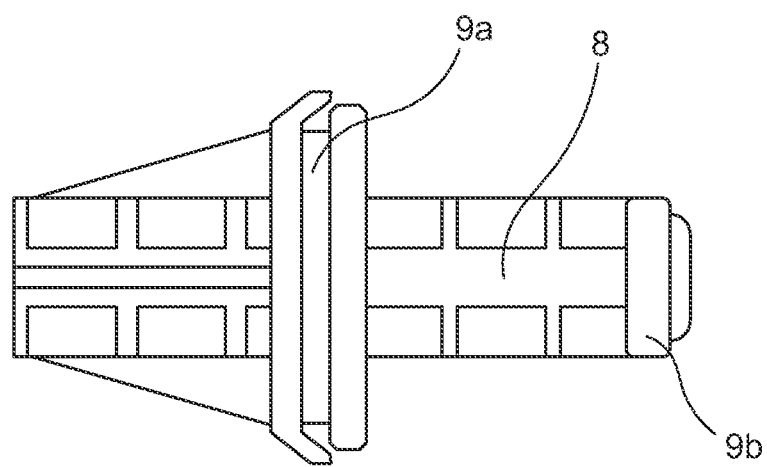
FIG. 2 shows the connection assembly in an overview, at the top with an integrally molded sealing body and at the bottom without a sealing body.
Figure 2:
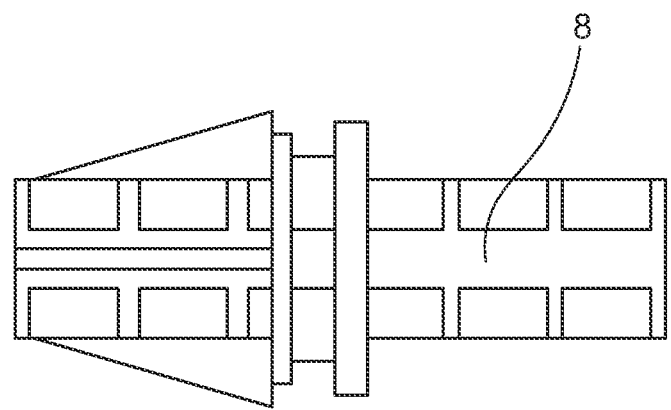

So that the actuating element or the Bowden cable 7 can be inserted sealed into the lock housing 2, a connection assembly according to the invention is provided, which is basically composed of a main body 8, which can be seen in FIG. 2, and a sealing body 9. The main body 8 is produced from rigid plastic, such as polyamide (PA) or polycarbonate (PC), for example. In contrast, an elastic plastic, for example styrene-butadiene rubber (SBR), is used to produce the sealing body 9.

The sealing body 9 made from the elastic plastic serves to seal the main body 8 against the lock housing 2. In addition, the sealing body 9 also provides a seal against the actuating element 7 for the at least one lock component 4, the pawl 4 in the exemplary embodiment.

For this purpose, the connection assembly or the main body 8, in conjunction with the sealing body 9, is inserted into a corresponding bore or opening in the lock housing 2. For this purpose, the sealing body 9 according to the exemplary embodiment is formed in two parts or in two pieces and is connected to the main body 8. In fact, the sealing body 9 is composed of a housing sealing body 9a, on the one hand, for sealing against the lock housing 2, and an actuating sealing body 9b, on the other hand, for sealing against the actuating element 7. Both sealing bodies 9a, 9b are functionally and locally separate from one another, as can be directly perceived with reference to FIGS. 2 to 4. It is also clear from these figures that both components of the sealing body 9, i.e. the housing sealing body 9a and the actuating sealing body 9b, are connected to the main body 8.

The sealing body 9 or the housing sealing body 9a, as well as the actuating sealing body 9b, are each connected to the main body 8 by being integrally molded. For this purpose, a two-component injection molding process is used according to the exemplary embodiment. For this purpose, the thermoplastic materials already mentioned above are used in a common injection mold, and first of all, the main body 8 is produced in accordance with the lower illustration in FIG. 2 and is then always surrounded or overmolded with the housing sealing body 9a and the actuating sealing body 9b.

Figure 3:
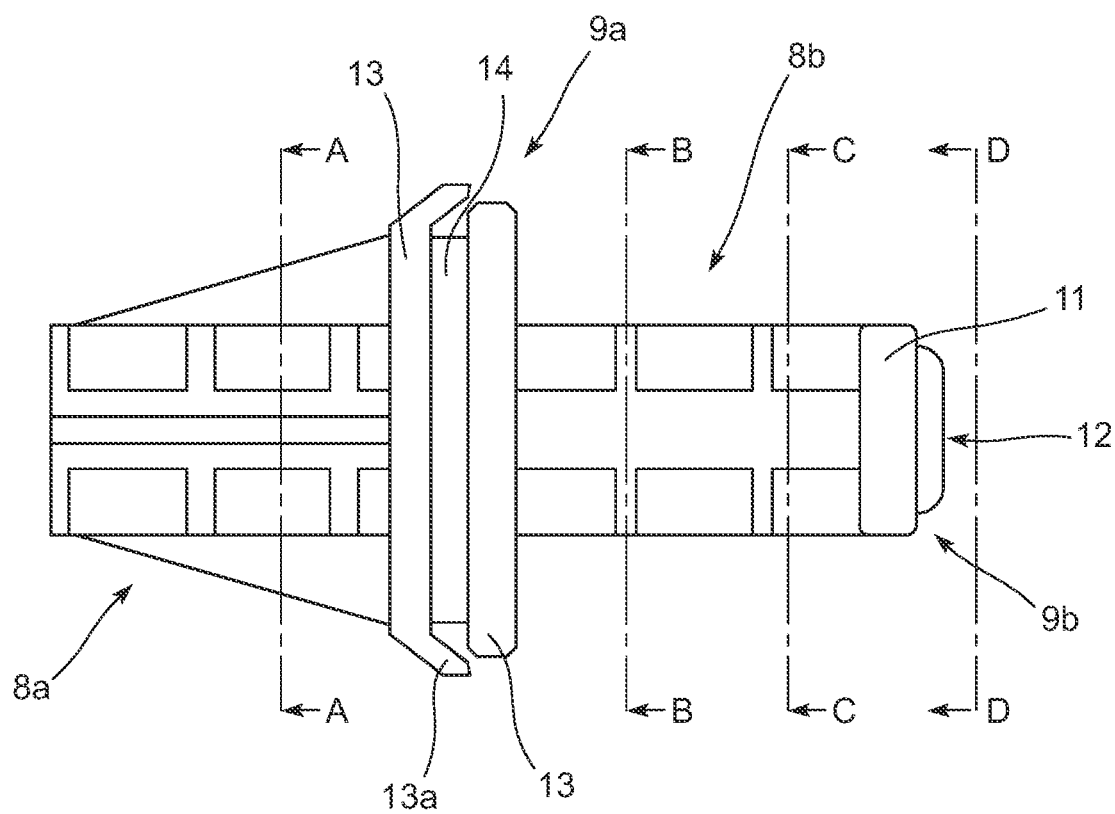
FIG. 3 shows the connection assembly according to the invention with associated respective cross sections.
Figure 3:
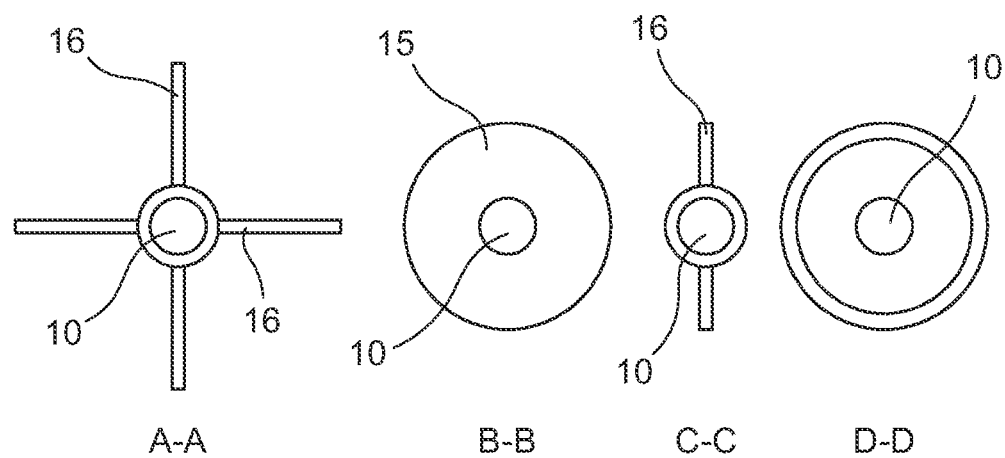

It can be seen from the individual sectional views in FIG. 3 that the main body 8 has a central bore 10 for the actuating element 7. In fact, a core not expressly shown is guided through this central bore 10 as a component of the Bowden cable 7 according to the exemplary embodiment. In contrast, on the outside, a sheath of the Bowden cable 7 adjoins a circumferential flange 11 of the actuating sealing body 9b, whereas a central grommet 12 provides for the passage of the core so that the core can simultaneously extend through the central bore 10.

The housing sealing body 9a is U-shaped in cross section and is equipped with two sealing sleeves 13 on both sides of a central indentation 14. The sleeves 13 on both sides are in each case on the inside and on the outside on a wall of the lock housing 2, whereas the indentation 14 fills the required opening in the wall of the lock housing 2. It can be seen that the outwardly facing sleeve 13 for the housing sealing body 9a is equipped with a sealing lip 13a that fits against the wall in an installed state.

In addition, the individual sectional representations in FIG. 3 make it clear that the main body 8 is formed predominantly cylindrically with a head component 8a of a larger diameter located outside or in the wall of the lock housing 2, on the one hand, and a foot component 8b of a smaller diameter connected thereto. In a corresponding sense, the housing sealing body 9a also has a larger diameter than the actuating sealing body 9b. Furthermore, it is clear from these different sectional views that the main body 8 is equipped with at least one reinforcing rib 15, 16 connected to the bore 10. In fact, it can be seen from FIG. 3 that a circumferential reinforcing rib 15 is realized in the region of the section B-B. In contrast, reinforcing ribs 16 extending radially relative to the bore 10 are observed in the region of the sections A-A and C-C.

In this case, in the region of the section A-A, i.e. in the head component 8a of the main body 8, four reinforcing ribs 16 extending radially relative to the bore 10 are each arranged at a 90° distance from one another. As a result, the head component 8a is designed to be particularly rigid and can function predominantly as a stop in the event of a crash. In contrast, in the region C-C and accordingly in the foot component 8b, only two radially extending reinforcing ribs 16 are observed at a 180° distance.

Figure 4:
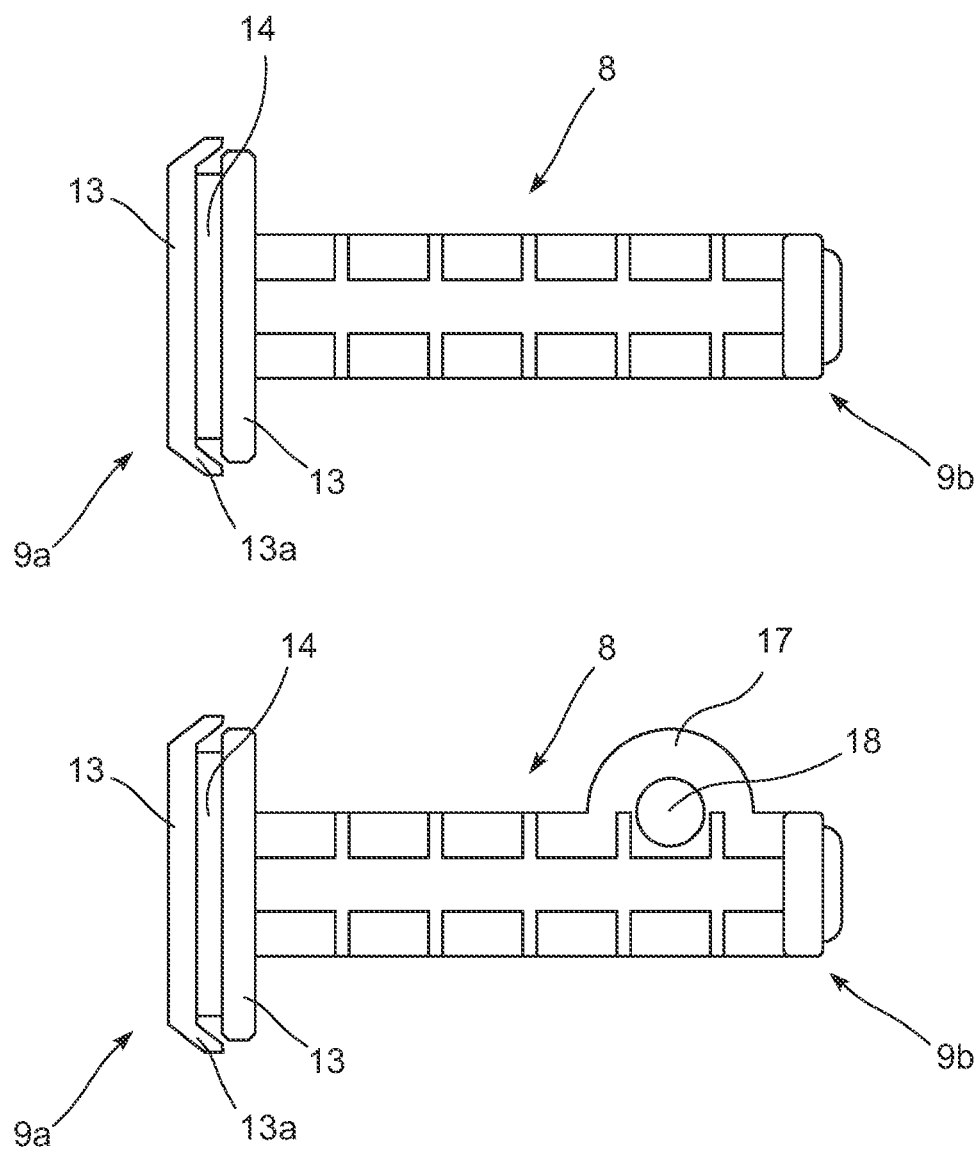
FIG. 4 shows different other embodiments.

The variants shown in FIG. 4 also have a head piece 8a and a foot piece 8b of the main body 8. In addition, a connection piece 17 integrally molded onto the main body 8 is provided there, with the aid of which the main body 8 can additionally be fixed to the lock housing 2. For this purpose, the connection piece 17 is equipped with a bore 18 for a corresponding connecting means. This can be a screw, a locking pin, etc.

LIST OF REFERENCE SIGNS

Motor vehicle door lock 1
Lock housing 2
Locking mechanism 3, 4
Rotary latch 3
Pawl 4
Motor vehicle door 5
Door handle 6
Actuating element 7
Bowden cable 7
Main body 8
Head component 8a
Foot component 8b
Sealing body 9
Housing sealing body 9a
Actuating sealing body 9b
Bore 10
Flange 11
Grommet 12
Sealing sleeves 13
Sealing lip 13a
Indentation 14
Reinforcing ribs 15, 16
Connection piece 17
Bore 18

The invention claimed is:

1. A Bowden cable connection assembly for use in a motor vehicle, comprising:
   a main body for insertion into a housing,
   a sealing body made from an elastic plastic for sealing the main body relative to the housing, and relative to an actuating element,
   wherein the sealing body is formed in two parts and is connected to the main body, wherein the first part is a housing sealing body for sealing against the housing and the second part is an actuating sealing body providing the seal against the actuating element,
   wherein the second part is functionally and locally separated from the first part, and
   wherein the housing sealing body includes a sealing sleeve on each side of a central indentation, and wherein the central indentation is shaped to receive the housing in the indentation.

2. The Bowden cable assembly of claim 1, wherein both the first part and the second part of the sealing body are connected to the main body.

3. The Bowden cable assembly of claim 2, wherein both the first part and the second part of the sealing body are integrally molded on the main body by a two-component injection molding process.

4. The Bowden cable assembly of claim 2, wherein the main body has a central bore for the actuating element.

5. The Bowden cable assembly of claim 4, wherein the main body has at least one reinforcing rib connected to the central bore.

6. The Bowden cable assembly of claim 5, wherein the at least one reinforcing rib is formed circumferentially and/or as a radial reinforcing rib relative to the central bore.

7. The Bowden cable assembly of claim 1, wherein the main body has a central bore for the actuating element.

8. The Bowden cable assembly of claim 7, wherein the main body has at least one reinforcing rib connected to the central bore.

9. The Bowden cable assembly of claim 8, wherein the at least one reinforcing rib is formed circumferentially and/or as a radial reinforcing rib relative to the central bore.

10. The Bowden cable assembly of claim 1, wherein the main body has an integrally molded connection piece.

11. The Bowden cable assembly of claim 1, wherein the main body is produced from a thermoplastic material including at least one of polyamide (PA), polybutylene terephthalate (PBTP), polycarbonate (PC), or styrene-butadiene (SB).

12. The Bowden cable connection assembly of claim 11, wherein the thermoplastic material includes embedded fibers comprising at least one of glass fibers or carbon fibers.

13. The Bowden cable assembly of claim 1, wherein the sealing body is produced from an elastomeric plastic including at least one of acrylonitrile butadiene rubber (NBR), ethylene propylene rubber (EPDM), natural rubber (NR) or styrene butadiene rubber (SBR).

14. The Bowden cable assembly of claim 1, wherein the main body is predominantly cylindrical with a head component of a first diameter located outside or in a wall of the housing and a foot component of a second diameter connected thereto, wherein the first diameter is larger than the second diameter.

15. The Bowden cable connection assembly of claim 1, wherein the Bowden cable connection assembly is used in a motor vehicle door lock.

16. The Bowden cable connection assembly of claim 1, wherein a sealing sleeve of the two sealing sleeves includes a sealing lip comprising a portion of the sealing sleeve angled toward the central indentation.

17. The Bowden cable connection assembly of claim 1, wherein:
the main body includes a head component portion and a foot component portion,
the main body has a central bore for the actuating element,
the head component portion includes four ribs connected to the central bore each extending radially from the central bore and the four ribs are arranged evenly around the central bore, and
the foot component portion includes two ribs connected to the central bore each extending radially from the central bore and the two ribs are arranged evenly around the central bore.

18. The Bowden cable connection assembly of claim 17, wherein the four ribs of the head component portion are tapered along a length of the main body.

* * * * *